(12) United States Patent
Graeler

(10) Patent No.: US 6,511,281 B2
(45) Date of Patent: Jan. 28, 2003

(54) DEVICE FOR PALLETIZING PARCELS

(75) Inventor: Guenter Graeler, Tecklenburg (DE)

(73) Assignee: Windmoeller & Hoelscher, Lengerich (DE)

( * ) Notice: Subject to any disclaimer, the term of this patent is extended or adjusted under 35 U.S.C. 154(b) by 0 days.

(21) Appl. No.: 09/816,336

(22) Filed: Mar. 26, 2001

(65) Prior Publication Data

US 2001/0024612 A1 Sep. 27, 2001

(30) Foreign Application Priority Data

Mar. 24, 2000 (DE) .......................... 100 14 628
May 8, 2000 (DE) .......................... 100 22 272

(51) Int. Cl.[7] .......................... B65G 57/03; B65G 57/24
(52) U.S. Cl. .......................... 414/791.6; 414/792.8; 414/792.9
(58) Field of Search .......................... 414/791.6, 792.8, 414/792.9, 924

(56) References Cited

U.S. PATENT DOCUMENTS

| 4,708,564 A | * | 11/1987 | Mylrea et al. | ........... 414/791.6 |
| 4,978,275 A | * | 12/1990 | Reid et al. | ............... 414/791.6 |
| 4,984,963 A | * | 1/1991 | Bon | .......................... 414/924 |
| 5,263,813 A | * | 11/1993 | Kiederle et al. | ......... 414/792.9 |
| 5,437,533 A | * | 8/1995 | Vandermeer et al. | .... 414/791.6 |
| 5,653,574 A | * | 8/1997 | Lin | .......................... 414/791.6 |
| 5,868,549 A | * | 2/1999 | Lee et al. | ................. 414/791.6 |
| 5,944,479 A | * | 8/1999 | Kanaya et al. | ........... 414/791.6 |
| 6,089,819 A | * | 7/2000 | Barnes | ..................... 414/791.6 |

FOREIGN PATENT DOCUMENTS

| DE | 32 10 189 | 9/1983 | |
| DE | 610780 A1 | * 8/1994 | .............. 414/791.6 |
| DE | 44 12 830 | 10/1995 | |
| DE | 197 00 359 | 7/1998 | |

* cited by examiner

*Primary Examiner*—Kathy Matecki
*Assistant Examiner*—Sang Kim
(74) *Attorney, Agent, or Firm*—Jacobson Holman PLLC

(57) ABSTRACT

A device is provided for palletizing parcels, preferably stacks of tubular sections or flat lying sacks. Said device comprises a lifting frame, which can be raised and lowered in a stand and which is provided with a roller track, in order to slide the pallets on and off. Said device also comprises a conveyor, which supplies the parcels to be stacked and from which a controlled accepting unit accepts the supplied parcels and deposits them on a pallet, provided on the roller track. To align the pallets accurately in relation to the accepting gripper, there are stops or clamping strips that can be moved in opposing directions in the lifting frame above the conveying plane of the roller track. Said stops or clamping strips act on the opposing sides or corners of the pallet and fix them in a position, in which the accepting unit deposits the parcels with positioning accuracy, according to the predetermined pattern, on the pallet.

20 Claims, 5 Drawing Sheets

DEVICE FOR PALLETIZING PARCELS

BACKGROUND OF THE INVENTION

1. Field of the Invention

The invention relates to a device for palletizing parcels, preferably stacks of tubular sections or flat lying sacks. Said device comprises a lifting frame, which can be raised and lowered in a stand and which is provided with a guide, slide or transport track, preferably a roller track, in order to slide the pallets on and off. Said device also comprises a conveyor, which supplies the parcels to be stacked and from which a controlled transfer unit takes the supplied parcels and deposits them on a pallet, provided on the guide, slide or transport track.

2. Description of the Related Art

For example, in the manufacture of sacks tubular sections, which are processed by molding the bottoms to the sacks, must usually be put into intermediate storage, because the tube drawing machines, producing the tubular sections, work at a significantly higher speed than the systems, processing the tubular sections into sacks. Such an intermediate storage is usually achieved by stacking the tubular sections into stacks, containing a predetermined number of items, and then depositing the stacks on manipulatable pallets. Furthermore, the manufactured sacks must usually also be stacked and the stacks must be deposited on pallets, in order to store or transport them.

In the known class of devices for palletizing, as described in the introductory part of the specification, there is the problem that the pallets, which receive the parcels and on which the parcels are deposited in multiple layers with straight edges, according to a specified pattern in accordance with the programmed control unit of the transfer gripper, are not aligned accurately in relation to the transfer gripper, so that the parcels are stacked into stacks that are offset or skewed on the pallet. This state can lead to problems during the conveying and storage sequence, because the stacks project beyond the side edges of the pallet.

SUMMARY OF THE INVENTION

Therefore, the object of the invention is to provide a device of the aforementioned class that guarantees that the pallets are always accurately aligned relative to the transfer gripper, so that it deposits the parcels to be palletized with positioning accuracy in several layers on the pallet.

The invention solves this problem associated with a device of the aforementioned class in that above the conveying plane of the guide, slide or transport track there are stops or clamping elements that can be moved in the opposing direction in the lifting frame and which act on the opposing sides or corners of the pallet and fix them in a position, in which the transfer unit deposits the parcels with positioning accuracy, according to the predetermined pattern, on the pallet.

In the device, according to the invention, the stops or the clamping elements, which can be moved in opposing directions, align the pallet in a predetermined position on the lifting frame and fix it in this position, whereby the stops can also act like clamping elements on the sides of the pallets with slight pressure and thus clamp the pallets in position. However, clamping is not necessary, since the stops can move the pallet into its correct position and hold it there even without the clamping effect. To prevent that the stops or clamping elements, which act on the opposing sides of the pallet, prevent the pallet from being moved into the aligned end position, the clamping forces of the stops or the clamping strips can be coordinated in such a manner that a pair of stops or clamping elements act only with less force on the pallet and the two other stops and clamping elements can shift the pallet into the aligned end position due to their greater force. When the pallet is accurately aligned on the lifting frame by means of the stops or clamping elements, the transfer gripper, which can be controlled by a computer, can deposit the parcels in layers, according to a predetermined pattern, in such a manner on the pallet that the palletized stacks exhibit straight edges and do not project beyond the pallets.

A further development of the invention provides that on both sides of the lifting frame are mounted four chain wheels around axles, running at right angles to the slide on and slide off direction of the pallets, so as to be mirror images in relation to the transversal central plane of the lifting frame. Two continuous chains run on each side of the chain wheels. Clamping or stop elements are fastened to the opposing chains at right angles to the conveying direction. The chains are provided in such a manner with drives that they traverse the clamping elements in opposing directions. The clamping elements are coordinated in such a manner that in their joined position they fix the pallet to be loaded between them in a position, in which it is in alignment with the accepting gripper in the conveying direction. The drives of the chains are only so strong that they come to a standstill, when the pallet is moved by the stop elements into a position, in which they rest on the front and rear side of the pallet.

To guarantee that the clamping or stop elements will move synchronously, the shafts of the inside chain wheels can be coupled together by means of gearwheels.

Preferably a pressure medium piston cylinder unit acts as the drive on a chain.

To align also the pallet, slid on the lifting frame, at right angles to the conveying direction, a further development of the invention provides that on both sides of the lifting frame are mounted chain wheels around axles, pointing in the conveying direction. Two continuous chains run over said chain wheels; and the stops or clamping elements, which run parallel to each other over holders, are fastened to the upper strands and the lower strands of the chains. Said stops or clamping elements can be moved stops or clamping elements in opposite directions by driving the chains synchronously. Even this drive is formed only so strong that it comes to a standstill when the stops or clamping elements rest on both sides of the pallet.

Expediently the sliders are guided by guide elements, for example sleeves, on a traverse that runs at right angles to said sleeves.

To drive the chains, there is a pressure medium piston cylinder unit, whose piston rod is fastened to a slider and whose cylinder is fastened to the lifting frame. Expediently the pressure medium cylinder unit comprises pneumatic cylinders.

Preferably the lifting frame is provided with driven rollers so that the pallets can be accepted by the lifting frame by suitably controlling the drive.

One embodiment of the invention is explained in detail below with reference to the drawings.

and

Figure 1:
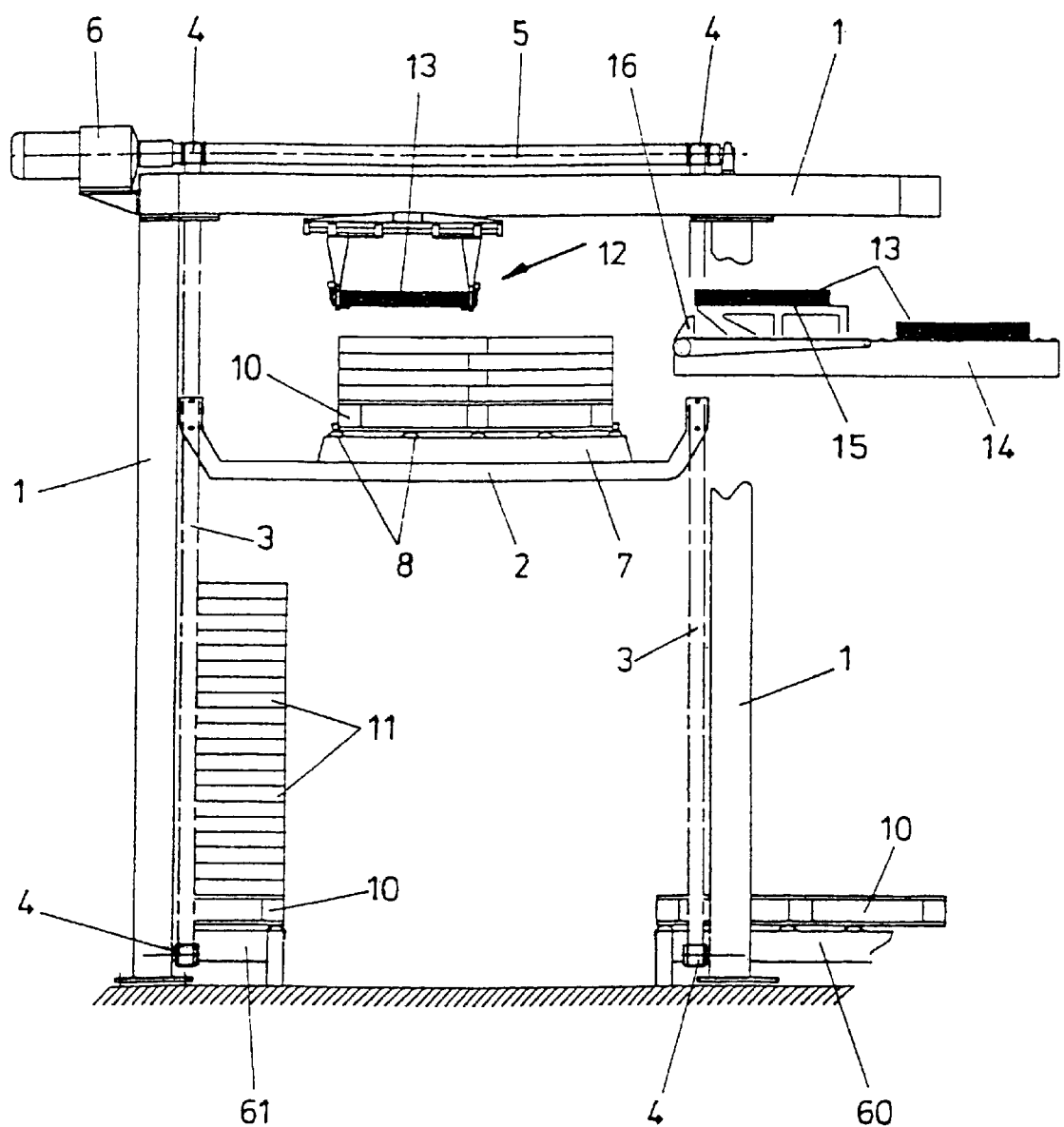
FIG. 1 is a schematic drawing of a side view of the device for palletizing parcels.
Figure 2A:
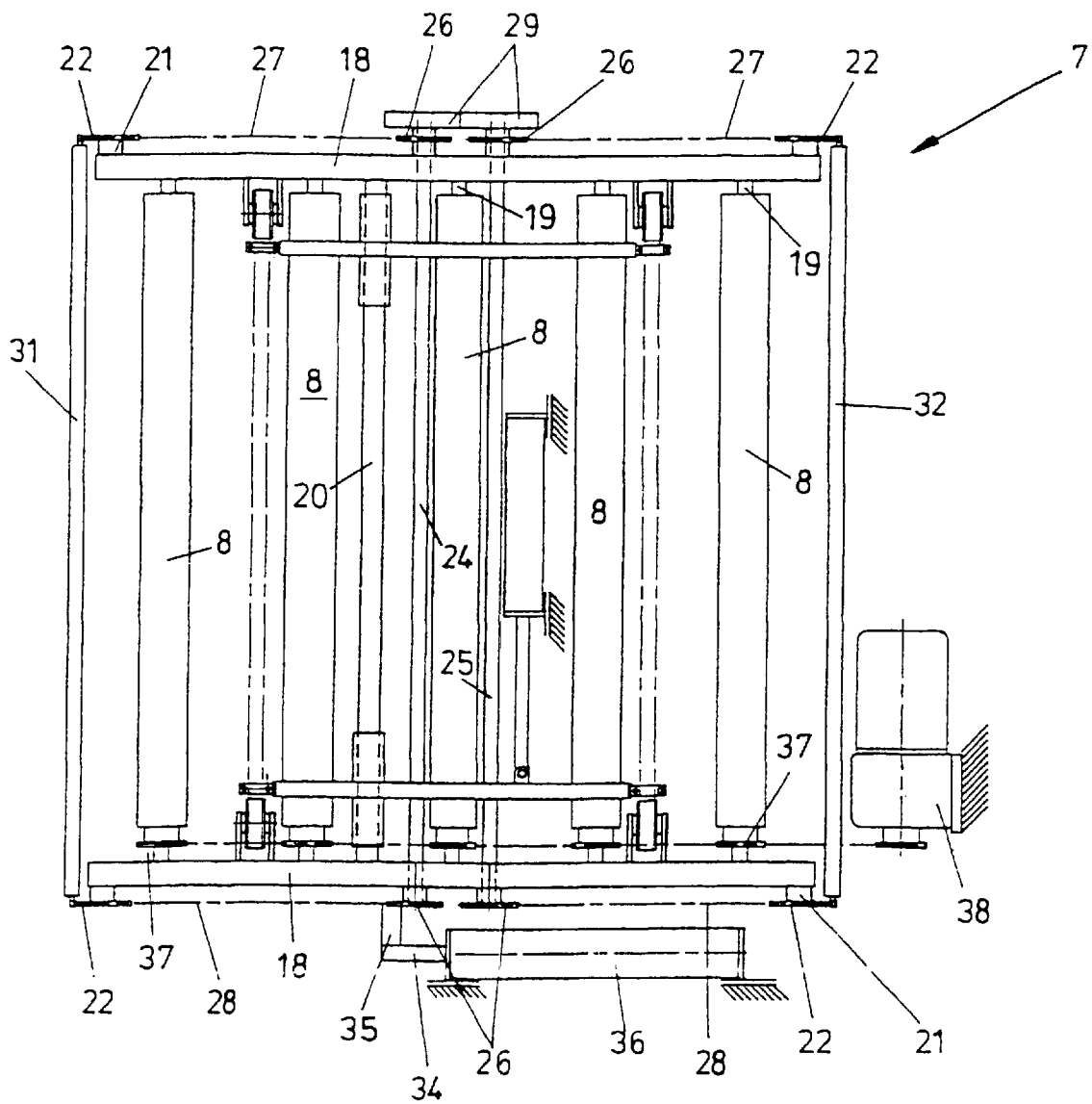
FIG. 2a is a top view of the lifting frame of the device, according to claim 1, with which the alignment strips, aligning the parcels in the conveying direction, are described.
Figure 2B:
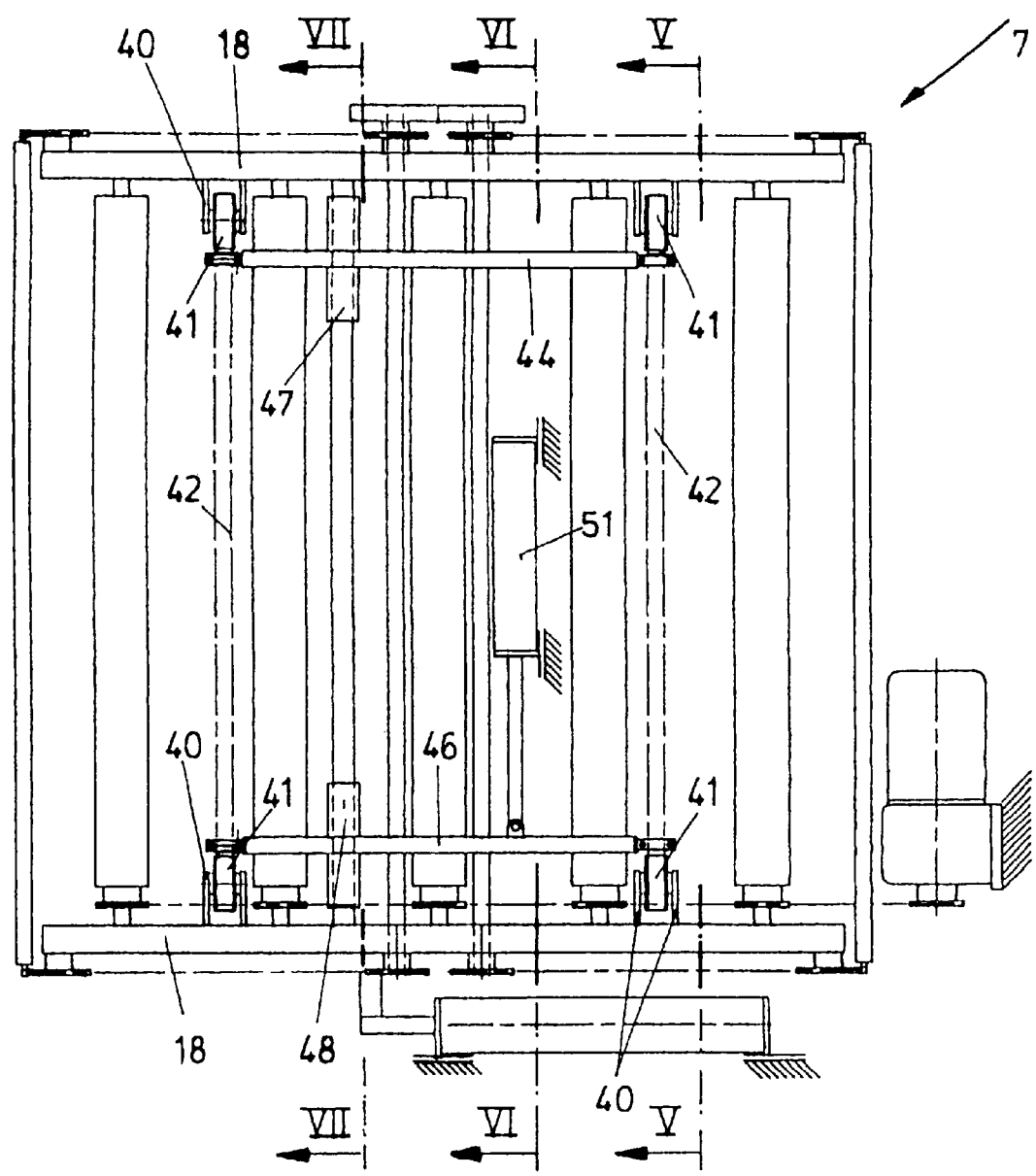
FIG. 2b is a top view of FIG. 2a, with which the sliders, aligning the parcels at right angles to the conveying direction, are described.
Figure 7:
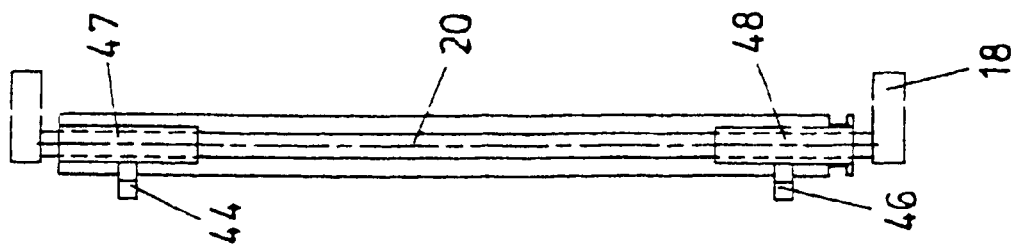
Figure 6:
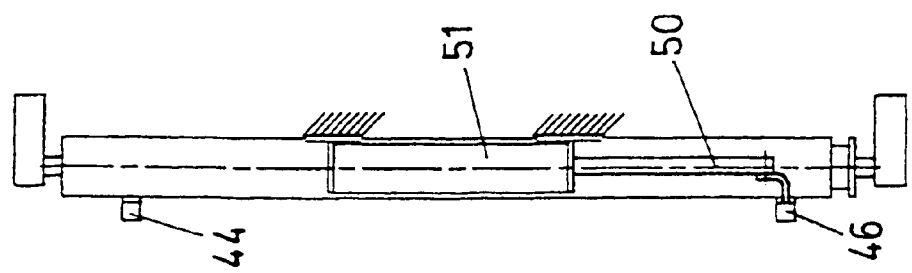
FIG. 6 is a view, corresponding to that in FIG. 5, along the line VI—VI in FIG. 2b.
Figure 5:
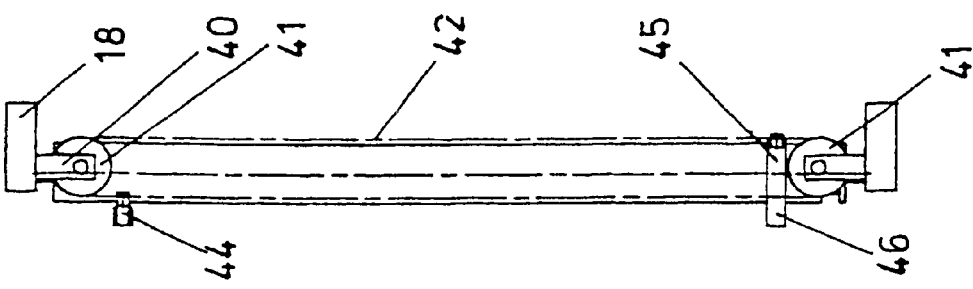
FIG. 5 is a side view of the sliders, aligning the parcels at right angles to the conveying direction, along the cutline V—V in FIG. 2b.

FIG. 7 is a view, corresponding to that in FIGS. 5 and 6, along the line VII—VII in FIG. 2b.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device for palletizing parcels comprises a frame-shaped stand 1, in which a lifting frame 2 can be raised and lowered. To raise the lifting frame 2, it is fastened to continuous belts 3 or chains on the opposing sides. Said belts or chains run over belt pulleys 4 or chain wheels, which are mounted in the upper and lower area of the stand. The upper belt pulleys 4, which are preferably provided in pairs and lie opposite each other, are connected together by means of a synchronizing shaft 5, which is driven by a controlled motor 6. Mounted on the lifting frame 2 is a frame 7, in which are mounted rollers 8 of a roller track and which is also provided with clamping and stop elements to slide and fix the pallets in an aligned position, as will be explained in detail below.

In the bottom position (not illustrated) of the lifting frame 2, empty pallets 10 are slid onto rollers 8 of the frame 7 by hand or by means of a driven conveyer 60, after the pallet 10, which is located on the roller track and loaded with parcels 11, has been transported away or slid off. Then the pallet 10, slid onto the roller track 7, 8, is put into the correct position on said roller track by means of clamping and stop elements; and then the roller track is moved in the upward direction by means of the lifting frame 2; and in particular into a position must below the transfer and positioning gripper 12, which then deposits the supplied parcels 13 on the pallet 10, according to a pattern, programmed into the control unit of the transfer gripper 12. The transfer gripper 12 exhibits a conventional design and can also be moved and additionally rotated not only in the longitudinal but also in the cross direction by means of a drive (not illustrated) in the guides of the stand 1.

The parcels 13, to be palletized, are supplied by means of a feed conveyor 14 in the upper region of the stand 1 and raised by means of a lifting table 15 in the end region of the feed conveyor 14, after said parcels have been aligned correctly in their transfer position in front of a stop 16. To accept individual parcels 13, the transfer gripper moves over the lifting table 15 so that said gripper takes from said table the next parcel 13 to be stacked. After depositing the parcel 13 in a layer, the lifting frame 2 is lowered by the height of the layer so that the transfer gripper 13 can deposit the next layer on the last one, thus stacking with a predetermined number of layers.

To align the pallets correctly on the frame 7 or the roller track 8, the pallets have clamping and stop elements, which fix and slide the pallets into their correct position, as is also described in detail below.

As evident from FIG. 2, the frame with the rollers 8 comprises lateral struts 18, which are connected together, by means of the axles 19 of the rollers 8 and a traverse 20, to form the frame 7. On the ends of the struts 18 the chain wheels 22 are mounted on journals 21, which point in the outward direction. On both sides of the transversal central plane of the frame 7, in which the central roller 8 is mounted, chain wheels 26 are mounted at equal intervals on the shafts 24, 25 on the outside of the struts 18. Continuous chains 27, 28 run over the chain wheels 22 and 26. The shafts 24, 25 are connected together by means of mating gearwheels 29 outside the upper frame 18. Thus, the gearwheels 29 guarantee a synchronous run of the chains 27, 28 and in particular in the opposing direction. Clamping elements 31, 32 are fastened by means of holding elements to the chains 27, 28 at equal intervals from the central plane, which is formed by the axis of the central roller 8. The piston rod 34 of a pneumatic cylinder 36 acts over a connecting piece 35 on the bottom chain 28, so that the chains 27, 28 can be driven by means of a suitably actuated pneumatic cylinder 36 in the same, but opposite direction.

The ends of the rollers 8 are provided with chain wheels 37, over which run the drive chains that are driven by a controlled motor 38.

Figure 3:
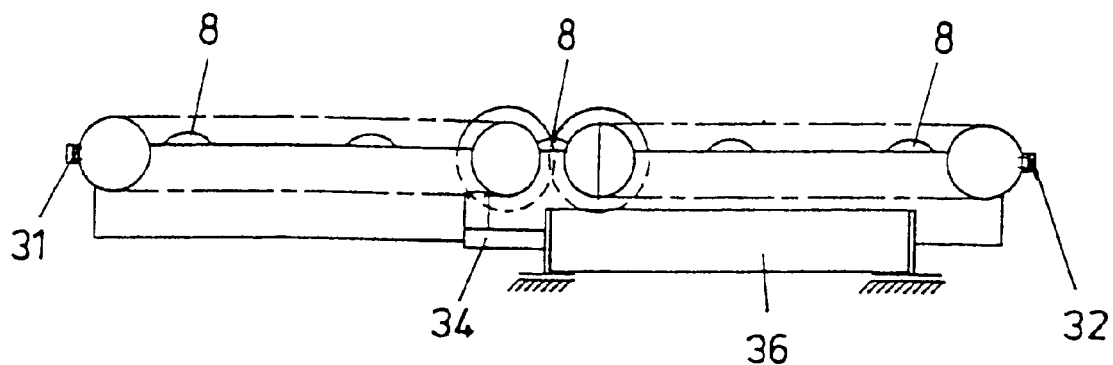
FIG. 3 is a side view of the alignment strips, aligning the parcels in the conveying direction, with related drives in a position, in which the parcels can be slid onto the lifting frame.

FIG. 3 depicts the clamping elements 31, 32 in a position, in which they are moved under the conveying plane of the rollers so that new pallets can be slid onto the roller track without any impediment, and filled pallets can be slid from it.

Figure 4:
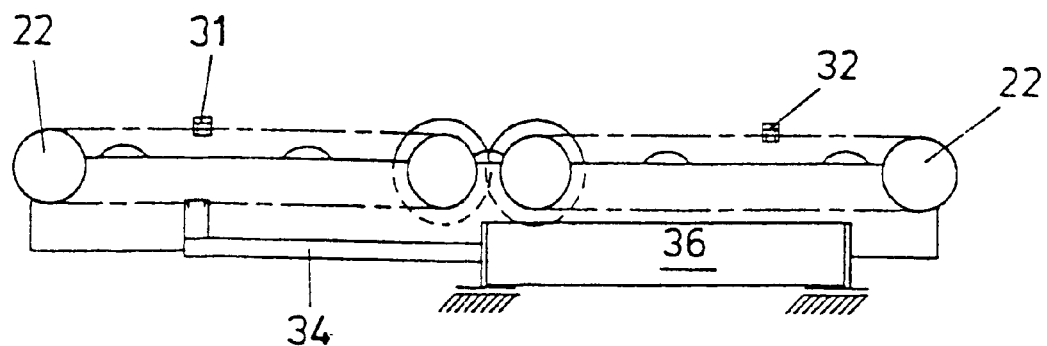
FIG. 4 is a view, corresponding to that in FIG. 3, in which the stop elements are moved in the direction of their aligned position.

FIG. 4 depicts the clamping elements 31, 32 in a position just above the conveying plane of the roller track, in which they join and approach a pallet, located on the roller track, and align said pallet and fasten said pallet between themselves.

As evident from FIG. 2b, forked bearing legs 40 are fastened to the struts 18 on their inside. Between the forked bearing legs deflecting rollers or chain wheels 41 can be freely rotated. Over the rollers or the chain wheels 41 run continuous belts or chains 42. A strip shaped slider 44 is fastened parallel to the struts 18 by means of corresponding holding elements at the upper strands of the continuous traction means 42. A stop element 46 is also fastened parallel to the struts 18 by means of holders 45 at the lower strands of the continuous traction means 42. The two parallel stop elements 44, 46 lie in a common plane above the conveying plane of the rollers 8. The stop element 44, 46 are fastened to sleeves 47, 48, which stand at right angles to said sliders and which can be slid longitudinally on the traverse 20. The piston rod 50 of a pneumatic cylinder 51 is hinged to the stop elements 46. The pneumatic cylinder 51 is fastened in the frame 7.

The stop elements 44, 46 are fastened to the upper and lower strands of the continuous traction means 42 in such a manner in relation to each other that they meet in the longitudinal central plane of the pallet to be aligned on the roller track. By suitably actuating the pneumatic cylinder 51, the stop elements 44, 46 can be closed and opened like pliers.

The pneumatic cylinders 36, 51 are controlled by the machine control unit.

On the frame 7, bearing the rollers 8 and moved into its lower position, the pallets 10 are supplied over a roller track 60. The loaded pallets 10 are carried away over a roller track 61. When the frame 7 has reached its lowest position, it covers a reference point initiator, which permits the roller track to be started in order to carry away the loaded pallet and to supply the empty pallet. Then the empty pallet, slid or conveyed on the roller track 8, is aligned on said track by means of the clamping elements 31 and 32 and the stop elements 44, 46. Then the roller track with the empty pallet is moved by means of the machine control unit up to and just below the transfer gripper 12.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for palletizing parcels comprising:
    a lifting frame, movable up and down in a stand and provided with a plurality of rollers forming a roller track for sliding pallets on and off said frame;
    a conveyor unit for supplying in a conveying direction parcels to be stacked on a pallet;
    a transfer unit for taking the supplied parcels from the conveyor unit and depositing said supplied parcels on the pallet;
    a pair of clamping elements synchronously movable toward and away from one another such that a first clamping element moves in the conveying direction while a second clamping element moves either toward or away from the first clamping element in a direction opposite said conveying direction; and
    a pair of stop elements synchronously movable toward and away from one another such that a first stop element moves transversely to the conveying direction while a second stop element moves also in a direction transverse to the conveying direction and either toward or away from the first stop element;
    said clamping elements and said stop elements acting on said pallets to adjust a position of said pallets on said roller track of said frame to accurately position parcels thereon.

2. The device as set forth in claim 1, wherein each side of said lifting frame includes four chain wheels mounted on axles which run perpendicularly to said conveying direction, a first continuous chain running over a first pair of said chain wheels and a second continuous chain running over a second pair of said chain wheels so as to be mirror images in relation to a transverse central plane of said lifting frame, said first clamping element mounted to said first chain and said second clamping element mounted to said second chain.

3. The device as set forth in claim 2, wherein an innermost chain wheel of said first pair of chainwheels is adjacent an innermost chain wheel of said second pair of chainwheel, shafts of said innermost chain wheels being coupled together by gearwheels to effect said synchronous movement.

4. The device as set forth in claim 3, wherein a piston cylinder unit acts to drive one of said chains.

5. The device as set forth in claim 2, wherein said first and second clamping elements are fastened to said first and second chains, respectively, at right angles to the conveying direction so as to extend from one side of the lifting frame to the other.

6. The device as set forth in claim 1, wherein each side of said lifting frame includes a chain wheel turning on an axle which runs parallel with said conveying direction, a continuous traction element running over said chain wheels substantially perpendicularly to said conveying direction, said first stop element mounted on an upper strand of said traction element and said second stop element mounted on a lower strand of said traction element such that driving of said traction element moves said first and second stop elements in opposite directions.

7. The device as set forth in claim 6, wherein each side of said lifting frame includes a pair of chain wheels, each chain wheel coupled to an aligned chain wheel on the other side of the lifting frame with a traction element having first and second stop elements mounted thereon, said traction elements being driven synchronously.

8. The device as set forth in claim 6, wherein said traction element is driven by a pressure medium piston cylinder unit having a piston rod fastened to one of said first and second stop elements and a cylinder fastened to said lifting frame.

9. A device for adjusting a pallet so that items may be accurately stacked thereon, said device comprising:
    a lifting frame, movable up and down in a stand and provided with a plurality of rollers forming a roller track for sliding a pallet on and off said lifting frame in a conveying direction, each side of said lifting frame including four chain wheels mounted on axles which run perpendicularly to said conveying direction, a first continuous chain running over a first pair of said chain wheels and a second continuous chain running over a second pair of said chain wheels so as to be mirror images in relation to a transverse central plane of said lifting frame;
    a pair of clamping elements synchronously movable toward and away from one another such that a first clamping element moves in the conveying direction while a second clamping element moves either toward or away from the first clamping element in a direction opposite said conveying direction, said first clamping element mounted to said first chain and said second clamping element mounted to said second chain, said clamping elements acting on opposite edges of said pallet to adjust a position of said pallet on said roller track of said frame; and
    a pair of stop elements movable in opposing directions transverse to said conveying direction for acting on said pallet substantially perpendicularly to said opposite edges to further adjust said pallet position on said lifting frame.

10. The device as set forth in claim 9, wherein an innermost chain wheel of said first pair of chainwheels is adjacent an innermost chain wheel of said second pair of chainwheel, shafts of said innermost chain wheels being coupled together by gearwheels to effect said synchronous movement.

11. The device as set forth in claim 9, wherein said first and second clamping elements are fastened to said first and second chains, respectively, at right angles to the conveying direction so as to extend from one side of the lifting frame to the other.

12. The device as set forth in claim 10, wherein a piston cylinder unit acts to drive one of said chains.

13. The device as set forth in claim 9, wherein said stop elements are synchronously movable toward and away from one another such that a first stop element moves transversely to the conveying direction while a second stop element moves either toward or away from the first stop element in a direction transverse to the conveying direction and opposite that of said first stop element.

14. The device as set forth in claim 9, wherein each side of said lifting frame further includes a chain wheel turning on an axle which runs parallel with said conveying direction, a continuous traction element running over said chain wheels substantially perpendicularly to said conveying direction, a first stop element of said pair mounted on an upper strand of said traction element and a second stop element of said pair mounted on a lower strand of said traction element such that said first stop element moves transversely to the conveying direction while said second stop element moves also in a direction transverse to the conveying direction and either toward or away from said first stop element, said stop elements acting on opposite edges of said pallet to adjust a position of said pallet on said roller track of said frame.

15. A device for adjusting a pallet so that items may be accurately stacked thereon, said device comprising:
 a lifting frame, movable up and down in a stand and provided with a plurality of rollers forming a roller track for sliding a pallet on and off said lifting frame in a conveying direction, each side of said lifting frame including a chain wheel turning on an axle which runs parallel with said conveying direction, a continuous traction element running over said chain wheels substantially perpendicularly to said conveying direction;
 a pair of stop elements synchronously movable toward and away from one another, a first stop element mounted on an upper strand of said traction element and a second stop element mounted on a lower strand of said traction element such that said first stop element moves transversely to the conveying direction while said second stop element moves also in a direction transverse to the conveying direction and either toward or away from the first stop element, said stop elements acting on opposite edges of said pallet to adjust a position of said pallet on said roller track of said frame; and
 first and second clamping elements movable in opposing directions either in or opposite said conveying direction for acting on edges of said pallet substantially perpendicular to said opposite edges to further adjust said pallet position on said lifting frame.

16. The device as set forth in claim 15, wherein each side of said lifting frame further includes four chain wheels mounted on axles which run perpendicularly to said conveying direction, a first continuous chain running over a first pair of said chain wheels and a second continuous chain running over a second pair of said chain wheels so as to be mirror images in relation to a transverse central plane of said lifting frame, said first clamping element mounted to said first chain and said second clamping element mounted to said second chain at right angles to the conveying direction so as to extend from one side of the lifting frame to the other side thereof.

17. The device as set forth in claim 16, wherein an innermost chain wheel of said first pair of chainwheels is adjacent an innermost chain wheel of said second pair of chainwheel, shafts of said innermost chain wheels being coupled together by gearwheels to effect synchronous movement of said chains.

18. The device as set forth in claim 17, wherein a piston cylinder unit acts to drive one of said chains.

19. The device as set forth in claim 15, wherein each side of said lifting frame includes a pair of chain wheels, each chain wheel coupled to an aligned chain wheel on the other side of the lifting frame with a traction element having first and second stop elements mounted thereon such that synchronous drive of said traction elements moves said first and second stop elements in opposite directions.

20. The device as set forth in claim 15, wherein said traction element is driven by a pressure medium piston cylinder unit having a piston rod fastened to one of said first and second stop elements and a cylinder fastened to said lifting frame.

* * * * *